US009606850B2

(12) United States Patent
Horley et al.

(10) Patent No.: US 9,606,850 B2
(45) Date of Patent: Mar. 28, 2017

(54) APPARATUS AND METHOD FOR TRACING EXCEPTIONS

(71) Applicant: ARM LIMITED, Cambridge (GB)

(72) Inventors: John Michael Horley, Cambridge (GB); Simon John Craske, Cambridge (GB)

(73) Assignee: ARM Limited, Cambridge, MA (US)

( * ) Notice: Subject to any disclaimer, the term of this patent is extended or adjusted under 35 U.S.C. 154(b) by 860 days.

(21) Appl. No.: 13/795,611

(22) Filed: Mar. 12, 2013

(65) Prior Publication Data
US 2014/0281433 A1 Sep. 18, 2014

(51) Int. Cl.
G06F 15/00 (2006.01)
G06F 9/44 (2006.01)
G06F 11/07 (2006.01)

(52) U.S. Cl.
CPC ...... *G06F 11/0766* (2013.01); *G06F 11/0721* (2013.01)

(58) Field of Classification Search
CPC .......................... G06F 9/30145; G06F 11/00
See application file for complete search history.

(56) References Cited

U.S. PATENT DOCUMENTS

| 5,797,019 A | 8/1998 | Levine et al. | |
|---|---|---|---|
| 6,886,094 B1* | 4/2005 | Blandy | G06F 9/30072 712/233 |
| 2001/0013118 A1* | 8/2001 | Krishnaswamy | G06F 9/542 717/141 |
| 2012/0036340 A1* | 2/2012 | Chaussade | G06F 9/30145 712/228 |
| 2012/0331197 A1* | 12/2012 | Campbell | G06F 13/1631 710/117 |
| 2013/0007533 A1 | 1/2013 | Miller et al. | |
| 2013/0198727 A1* | 8/2013 | Darcy | G06F 11/3624 717/140 |
| 2013/0326199 A1* | 12/2013 | Magklis | G06F 9/3001 712/222 |
| 2014/0237300 A1* | 8/2014 | Horley | G06F 11/3664 714/45 |

OTHER PUBLICATIONS

GB Search Report dated May 15, 2014 in GB 1321222.0.

* cited by examiner

*Primary Examiner* — Hyun Nam
(74) *Attorney, Agent, or Firm* — Nixon & Vanderhye P.C.

(57) ABSTRACT

A data processing apparatus comprises processing circuitry for executing a stream of instructions, and exception handling circuitry for selecting, from one or more exceptions, an exception to be handled by the processing circuitry. The unselected exceptions are referred to as pending exceptions. The data processing apparatus further comprises trace generating circuitry that generates trace data packets in dependence on activity of the processing circuitry. The trace generating circuitry detects pending exceptions and, if an exception is detected to be pending, includes an indication of the pending exception in at least one trace data packet. By tracking when a particular exception is pended, rather than when it is selected for handling by the processing circuitry, it is possible to more precisely determine when the exception occurred, as opposed to when it is finally handled.

15 Claims, 3 Drawing Sheets

| TYPE[9:0] | Exception | TYPE[9:0] | Exception | TYPE[9:0] | Exception |
|---|---|---|---|---|---|
| b00_0000_0000 | Reserved | b00_0001_0000 | IRQ0 | b00_0010_0000 to b00_0010_1111 | Reserved for IMPDEF exceptions |
| b00_0000_0001 | Processor Reset | b00_0001_0001 | IRQ1 | | |
| b00_0000_0010 | NMI | b00_0001_0010 | IRQ2 | | |
| b00_0000_0011 | HardFault | b00_0001_0011 | IRQ3 | b00_0011_0000 to b01_1111_1111 | Reserved |
| b00_0000_0100 | MemManage | b00_0001_0100 | IRQ4 | | |
| b00_0000_0101 | BusFault | b00_0001_0101 | IRQ5 | | |
| b00_0000_0110 | UsageFault | b00_0001_0110 | IRQ6 | b10_0000_0000 to b10_0000_0111 | Reserved |
| b00_0000_0111 | Reserved | b00_0001_0111 | IRQ7 | | |
| b00_0000_1000 | Reserved | b00_0001_1000 | Debug Halt | | |
| b00_0000_1001 | Reserved | b00_0001_1001 | Lazy FP push | b10_0000_1000 to b11_1110_1111 | IRQ8 to IRQ495 |
| b00_0000_1010 | Reserved | b00_0001_1010 | Lockup | | |
| b00_0000_1011 | SVC | b00_0001_1011 | Reserved | | |
| b00_0000_1100 | Debug Monitor | b00_0001_1100 | Reserved | b11_1111_0000 to b11_1111_1111 | Reserved |
| b00_0000_1101 | Reserved | b00_0001_1101 | Reserved | | |
| b00_0000_1110 | PendSV | b00_0001_1110 | Reserved | | |
| b00_0000_1111 | SysTick | b00_0001_1111 | Reserved | | |

FIG. 2

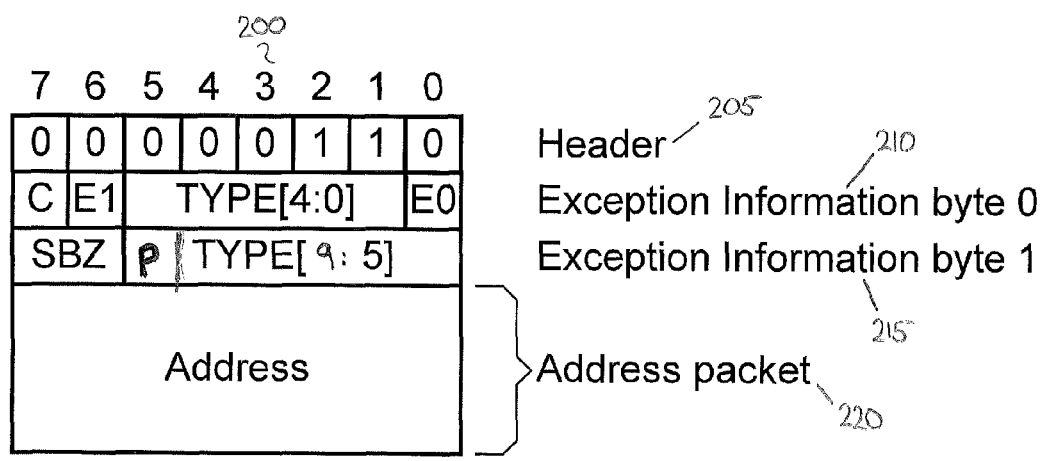

FIG. 3

APPARATUS AND METHOD FOR TRACING EXCEPTIONS

BACKGROUND OF THE INVENTION

Field of the Invention

The present invention relates to the field of data processing and, in particular, performing tracing when handling exceptions in a data processing apparatus.

Background

Tracing is a technique used in data processing apparatus, which involves generating trace data packets that provide additional information relating to the processing activities of devices within a data processing apparatus, particularly the processing circuitry. By providing additional information on the data processing apparatus, it is possible to observe the actions taken by the data processing apparatus when carrying out tasks. Information recorded in a trace may include not only the actions taken by the data processing apparatus but also when each action was performed. If the processing apparatus behaves in an unexpected manner, it is possible for a hardware or software developer to review the trace data in order to determine the original cause of the unexpected behaviour, and to prevent it from occurring again in the future.

It is known in the field of processing devices to use exceptions to indicate that a particular event has occurred. When an exception is taken, the processing circuitry executes an exception handling routine to take some action in response to the exception. For example, an exception may be raised to indicate the availability of data from an external data device, in which case the exception handling routine may cause the processing circuitry to fetch the available data and store it in a buffer. Another example of an exception is to indicate that a fault has occurred, in which case the exception handling routine may cause the processing circuitry to attempt to recover from the fault, or to mitigate any damage caused as a result of the fault.

It is possible to use tracing to monitor the occurrence of exceptions. Typically this is done by generating a trace data packet whenever an exception is taken.

SUMMARY OF THE INVENTION

According to a first aspect of the invention there is provided a data processing apparatus comprising processing circuitry configured to execute a stream of instructions; exception handling circuitry configured to select, from one or more exceptions, an exception to be handled by the processing circuitry, wherein any unselected exceptions remain pending; and trace generating circuitry configured to generate trace data packets in dependence on activity of the processing circuitry; wherein the trace generating circuitry is configured to detect pending exceptions and, if an exception is detected to be pending, to include in at least one trace data packet an indication of the pending exception.

In accordance with the above aspect, it is possible to determine from the trace data when an exception was pending (i.e. raised without being selected). Consequently, a developer can review the trace data packets and determine the operating state of the data processing apparatus at the time the exception was initially raised, rather than when the exception was finally selected for handling. Knowing the operating state of the data processing apparatus at the time the exception was raised makes it easier to help in diagnosing the behaviour of a data processing apparatus, since the developer is able to better judge what the original cause of the raised exception might be.

Since exceptions often arise as a result of an unexpected situation, they may be prone to causing further unexpected errors themselves. In such situations, if a fault occurs, it is possible for a large chain of exceptions to be raised, which can make it difficult for a developer to determine the original cause of the fault. However, by being able to determine the state of a data processing apparatus when a particular exception was pending, rather than when it was taken, it is possible for a developer to review the sequence of events that caused the original exception to be raised. For example, a memory fault may be triggered when fetching the exception handling routine from memory. Another exception handling routine would then be called for that memory access fault exception, and if this causes a further memory access fault (e.g. this may happen if the exception vector table is corrupted), then yet another exception may occur. In previous tracing techniques, such a cascade of exceptions can be very difficult for a developer to follow using the trace data because the original exception that caused the cascade (the first memory access fault exception) would typically be handled last after all the other exceptions have been resolved, and so the trace packets relating to the taking of the original exception may be far away in the trace stream from other trace packets that refer to the operating state of the data apparatus at the time that original exception was initially raised. Accordingly, by providing a pending indication in response to detecting a pending exception, it may be more easy to diagnose problems in the data processing apparatus and to follow the cascade of exception events that occurred.

In some embodiments, the trace generating circuitry is configured to include the indication of a pending exception in a trace data packet that is generated as a result of an exception being selected for handling. That is, when the exception handling circuitry selects an exception to be handled by the processing circuitry, a trace data packet will be generated by the trace generating circuitry. The trace generating circuitry will also determine whether there are any pending exceptions and will include this information in that trace data packet. A trace data packet produced in this manner therefore indicates that a first exception has been selected, and also indicates whether a second exception is pending. In this embodiment, there is no need to generate a specific trace data packet to indicate that an exception is pending. Accordingly, by including the indication of a pending exception in a trace data packet generated in response to an exception being selected, it is possible to be more efficient with the trace protocol bandwidth.

Furthermore, since a pending exception can only be pending if another exception has been selected, then tracking pending exceptions when another exception has been selected would generally be sufficient, and so it can be unnecessary to find pending exceptions by continually checking for them. Instead, it is sufficient to check for pending exceptions whenever an exception selection is made. By reducing the need to continually scan for pending exceptions, it is possible to also reduce the amount of processing that needs to be carried out by the trace unit.

In some embodiments, the trace data packet may comprise an indication of an exception type of the exception that is selected to be handled by the processing circuitry. If it is known what the type of the selected exception is, it may be possible to infer further information about the pending exception. In some instances, in reviewing the trace produced by the trace data packets, it may be possible to infer an original cause of a fault from the type of exception which has occurred.

In some embodiments, the trace data packet comprises an indication of an execution point of the stream of instructions carried out by the processing circuitry when the pending exception is detected. For example, this indication of an execution point may be an instruction address. However, the indication of the execution point need not be an exact reference to a particular instruction. In some embodiments, the indication may comprise a region of code, for example, a block of code defined by two branch instructions. In still further embodiments, the indication of an execution point may provide an address, but this address may be provided with some degree of error or uncertainty. Where an address is provided, the address may be an absolute address or a relative address indicating the displacement of the current execution point from the address of a preceding branch instruction. Accordingly, by reviewing the trace data packets produced it is possible to at which part of the stream of instructions the pending exception was raised.

The indication of a pending exception may take a variety of forms. However, in one embodiment the indication is a bit in a trace data packet and indicates whether or not a pending exception is detected. In such embodiments, when the bit is set, it indicates that a pending exception is detected whereas when the bit is not set, it indicates that a pending exception is not detected.

In some embodiments, the trace generating circuitry is configured to include the indication of the pending exception in a trace data packet only if the pending exception has a particular predetermined characteristic. Examples of predetermined characteristics are: the pending exception being one of a predefined set of exception types, the pending exception having an associated priority greater than a predefined priority, or whether the pending exception is indicative of a fault having occurred in the data processing apparatus. It will be appreciated by the skilled person that the predetermined characteristic may comprise any combination of these examples, and may also include other characteristics of a pending exception. The advantage of including the indication of the pending exception for only a subset of exceptions is that the number of reported pending exceptions can be reduced. This leads to a reduction in processing power and energy consumption as fewer exception lines need to be monitored for pending exceptions. Also, in an embodiment for which the pending exception indication is included in an additional trace packet then monitoring fewer pending exceptions also allow a reduction in the trace bandwidth that is consumed, since the number of trace data packets that are generated is reduced.

In the above example, the phrase "having an associated priority greater than a predetermined priority" is not intended to be limited to numeric priority values, but rather to the fact that the pending exception is more important than a given level. Phrased differently, the predetermined characteristic may comprise whether the importance of the pending exception is sufficient for that pending exception to be reported. By using such a predetermined characteristic, it is possible to determine from the trace data packets that an exception of high importance could not be immediately dealt with by the processing circuitry and instead had to be pended.

Also in the above examples, the term "fault" may refer to a soft fault or a hard fault. That is, the term is not limited to a fault that can or cannot be recovered from, but instead refers to the situation in which something has gone wrong, such as an invalid memory access request having been issued. As an example, in the ARMv6-M, and ARMv7-M processors, an exception representing a fault may be considered to be one with a type of: HardFault, MemManage, or BusFault. The skilled person will appreciate that the classification of which exceptions constitute a fault will depend on the extent to which reporting is desired.

In some embodiments, the exception handling circuitry is configured to select the exception to be handled by the processing circuitry based on a priority of said one or more exceptions. Consequently, it is possible for an exception having a high priority to be pended as a result of an exception having an even higher priority being selected to be dealt with by the processing circuitry. For example, a bus error fault exception may be an exception with a relatively high priority. However, an even higher priority exception may be a non-maskable interrupt, which is an interrupt that must be responded to immediately and cannot be pended. Consequently, if both a bus error fault and a non-maskable interrupt are raised at similar times, the bus error fault, despite being of high priority, must be pended and the non-maskable interrupt must be selected.

In some embodiments, the trace generating circuitry is configured to generate a further trace data packet if the pended exception is subsequently selected by the exception handling circuitry. In this case, the further trace data packet contains an indication of the selected exception. In this way, it is possible for a user reviewing the trace data packets to estimate the period during which each exception remained pending. It is often useful to know that exceptions are being pended for a long period, since this may itself be indicative of problems in the data processing apparatus or in the exception handling routines.

In some embodiments, the trace generating circuitry generates distinct trace data packets for indicating an exception being selected to be handled by the processing circuitry and for indicating the detection of a pending exception. That is, the trace generating circuitry is configured to generate a first trace data packet in response to the exception handling circuitry selecting an exception to be handled by the processing circuitry and the trace generating circuitry is also configured to generate a second trace data packet comprising said indication of the pending exception if an exception is detected to be pending. The first and second trace data packets could both be generated in response to detecting that an exception is selected. Alternatively, a period of time may elapse between the generation of the second trace data packet when an exception has been pended, and generation of a first trace data packet when an exception has been selected. This means that trace data packets can be generated and output at the time that exceptions are pending, rather than when another exception is selected for handling This may occur, for example, when an unimportant (e.g. low priority) exception is pended while executing a more important exception. In embodiments in which separate trace packets are generated for indicating pending and selected exceptions, a developer can filter the trace data packets based on their type, for example, in order to review all trace data packets relating to pending exceptions.

According to a second aspect of the invention there is provided a trace generating apparatus configured to generate trace data packets in dependence on activity of processing circuitry for executing a stream of instructions, wherein said trace generating circuitry is configured to detect pending exceptions which have not yet been selected to be handled by said processing circuitry; and the trace generating circuitry is configured to include in at least one trace data packet an indication of the pending exception if an exception is detected to be pending.

According to a third aspect of the invention there is provided a data processing method comprising the steps of: executing a stream of instructions; selecting, from one or more exceptions, an exception to be handled by processing circuitry, wherein any unselected exceptions remain pending; and generating trace data packets in dependence on activity of the processing circuitry, wherein the generating comprises detecting pending exceptions and, if an exception is detected to be pending, including in at least one trace data packet an indication of the pending exception.

According to a fourth aspect of the invention there is provided a data processing apparatus comprising: processing means for executing a stream of instructions; exception handling means for selecting, from one or more exceptions, an exception to be handled by the processing means, wherein any unselected exceptions remain pending; and trace generating means for generating trace data packets in dependence on activity of the processing means; wherein the trace generating means is configured to detect pending exceptions and, if an exception is detected to be pending, to include in at least one trace data packet an indication of the pending exception.

The term "set" has been used throughout this description. It will be clear to a person of ordinary skill in the art that such a term may either refer to the storing of a value of logical '1' or the storing of logical '0'. Similarly, the terms "not set", "clear", and "unset" may be used interchangeably to refer to storing an inverse of the aforementioned bit, and accordingly may either refer to the setting of a logical '0' or a logical '1', respectively.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 shows examples of different exceptions;

FIG. 3 shows an example of a trace data packet in accordance with one embodiment;

DESCRIPTION OF EXAMPLE EMBODIMENTS

Figure 1:
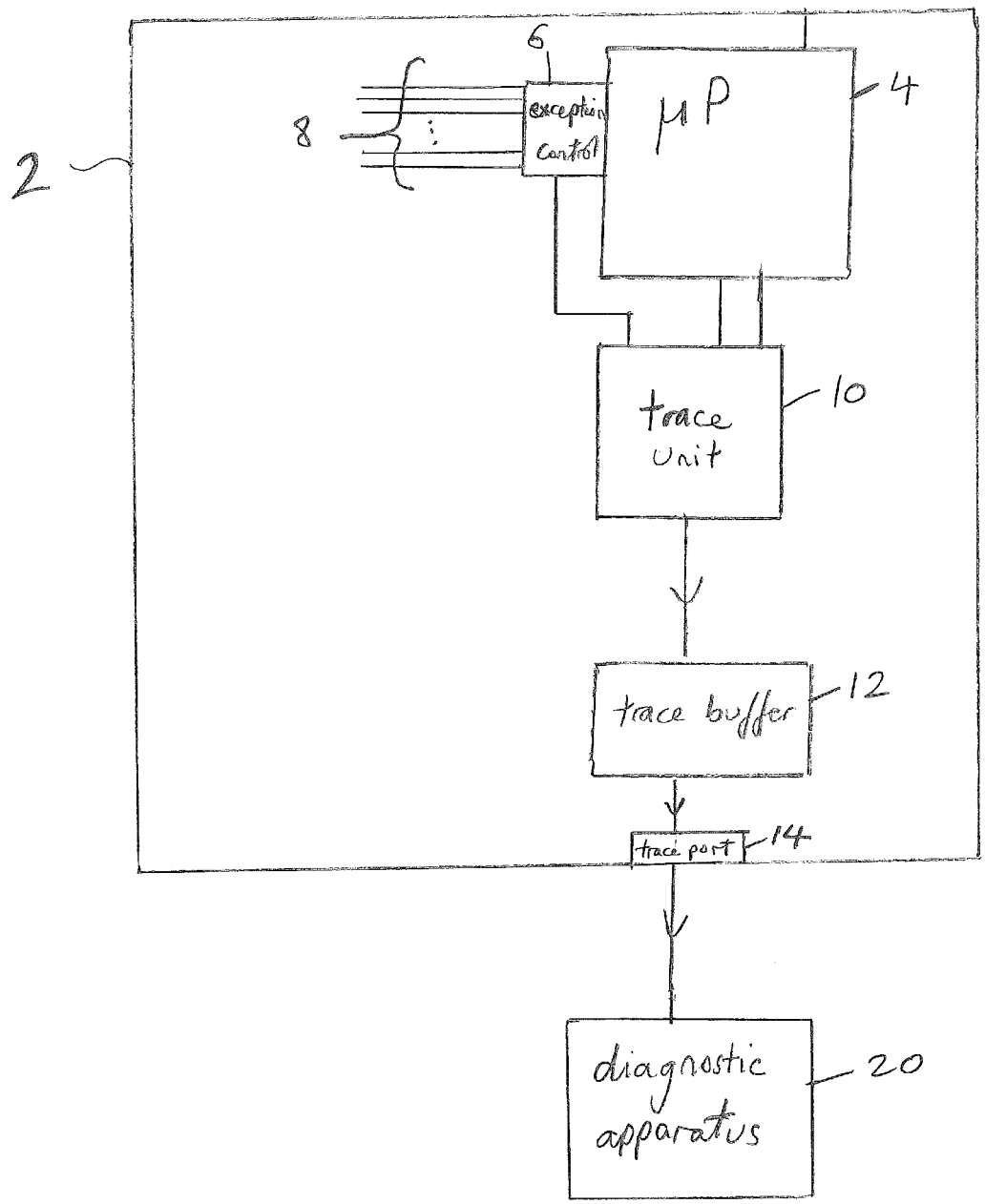
FIG. 1 schematically shows a data processing apparatus in accordance with one embodiment.

FIG. 1 shows an example data processing apparatus 2 in accordance with one embodiment. Data processing apparatus 2 comprises a microprocessor 4, which executes a stream of instructions. Exception control circuitry 6 receives one or more signals on incoming lines 8. The assertion of a signal on one of the incoming lines 8 indicates that a particular exception (e.g. an interrupt) has been raised. Although not shown, the incoming lines 8 may be connected to any combination of hardware devices internal or external to the data processing apparatus, which may include the microprocessor 4 itself. In this embodiment, the exception control circuitry 6 is shown as a separate element to microprocessor 4. However, as will be appreciated by the skilled person, the exception control circuitry could also form part of microprocessor 4. Exception control circuitry 6 is configured to select an exception to be handled by microprocessor 4, based on the signals that have been asserted on incoming lines 8. In this embodiment, an exception is said to be pending from the time that it is raised until the time at which it is either selected or the need for the exception is removed. In some embodiments, the exception signal may be unasserted to show that the need for the exception has been removed.

In this embodiment, trace unit 10 is configured to perform tracing on data processing apparatus 2. Tracing unit 10 is able to "snoop" on at least the microprocessor 4 and exception control circuitry 6. In this manner, trace unit 10 is aware of activities carried out by the microprocessor 4 and also the exception control circuitry 6. Although the term "snoop" has been used here, it will be understood by the skilled person that in alternative embodiments, trace unit 10 may derive this information through reports received from exception control circuitry 6 and microprocessor 4. Furthermore, in other embodiments, trace unit 10 may derive this information in another manner. In the embodiment shown in FIG. 1, when exception control circuitry 6 selects an exception to be handled by microprocessor 4, trace unit 10 generates a trace data packet, an example of which is shown in FIG. 3. During generation of the trace data packet, trace unit 10 detects whether there are any pending exceptions in exception control circuitry 6. Whether or not there are any pending exceptions is noted in the trace data packet generated by trace unit 10.

Trace data packets that are generated by trace unit 10 are forwarded and stored in trace buffer 12. The trace data packets are then output to diagnostic apparatus 20 via trace port 14. The diagnostic apparatus 20 is used to analyse the trace data packets in order to determine information about the data processing apparatus 2 while it executes a stream of instructions. An example of a diagnostic apparatus would be a personal computer (PC). By analysing the trace data packets, the developer can examine the behaviour of data processing apparatus 2 as it executes the stream of instructions, which can be useful during development of the processing hardware or software running on the system.

FIG. 2 is a table showing an example of different exception types and their associated exception type identifier. Each exception type identifier can be represented by a 10-bit field. For example, the exception type identifier for BusFault is b00_0000_0101. The exception type identifier may form part of a data trace packet, an example of which is shown in FIG. 3.

FIG. 3 shows a trace data packet 200 in accordance with one embodiment. It will be appreciated that in other embodiments, different trace data packet formats could be used. The trace data packet shown in FIG. 3 may be generated in trace unit 10 in response to exception control circuitry 6 selecting an exception to be handled by microprocessor 4. The trace data packet 200 comprises a number of fields, as discussed below.

The trace data packet 200 has an 8-bit header indicating that this trace packet is an exception trace data packet, i.e. a trace data packet that has been generated in response to an exception being selected for handling by microprocessor 4. The trace data packet also has two bytes of exception information 210, 215 and an address field 220. The bytes 210, 215 of exception information include an exception type field TYPE[9:0] for identifying the type of exception that has occurred using one of the identifiers shown in FIG. 2, for example. An additional bit is used to provide the P field, which is discussed below. FIG. 2 shows examples of exceptions and their corresponding types.

The address field 220 indicates the point of execution in the stream of instructions executed by the microprocessor 4 at which the exception has occurred. This may be indicated as an instruction address or partial instruction address. The address may be derived from the program counter of the microprocessor 4. The address may be an absolute address or a relative address indicating the displacement of the current execution point from the address of a preceding branch instruction. The address field may be sent in a separate data trace packet to the remainder of the data. The address field may also therefore be referred to as an address packet.

Trace data packet 200 includes a pending exception field P, which is used to indicate whether there is a pending exception at the exception control circuitry 6. In this embodiment, the field P is provided by using a specific bit of the data trace packet. When trace unit 10 detects that an exception has been selected by the exception control circuitry 6, it generates the exception trace data packet, and also detects whether there are any other pending exceptions at the exception control circuitry 6 having a predetermined characteristic (e.g. whether the exception has a priority of at least a threshold level, or whether the exception has one of a predetermined subset of exception types). If such a pending exception is detected, the field P is set and if no pending exception having the predetermined characteristic is detected, the field P is clear. An analysis of a trace data packet therefore reveals whether, at the time that an exception was selected, there was at least one other exception pending.

Trace data packet 200 also includes an extension field C which indicates whether the second byte 215 of exception information is present. The second byte 215 of exception information extends the range of the exception type field from 5 bits to 10 bits. For some types of exceptions, for which the upper 5 bits of the exception identifier are zero, it is sometimes possible to omit the second byte 215 and the upper 5 bits of the type field can be assumed to be zero and the value of the extension field P can also assumed to be zero. The second byte of information 215 is included when an exception identifier is required which has a bit value of 1 in one of the upper 5 bits TYPE[9:5] or when pending exception field P is required in order to indicate that an exception is pending. Using this technique, the amount of trace data can be compressed where possible.

The first byte of exception information 34 also includes some fields E0, E1 which contain indications of whether any instructions were executed since the previous branch instruction but before the occurrence of the relevant exception condition. If these fields indicate that no more instructions were executed since the previous branch instruction, then the address field 220 may be omitted to reduce the amount of trace data and avoid using as much bandwidth in the trace buffer 12 or trace port 14. The second byte of exception information 215 also includes some "should be zero" values SBZ which are reserved and are always set to zero. If more information needs to be included in the trace packet then this could be encoded in the "should be zero" field.

Figure 4:
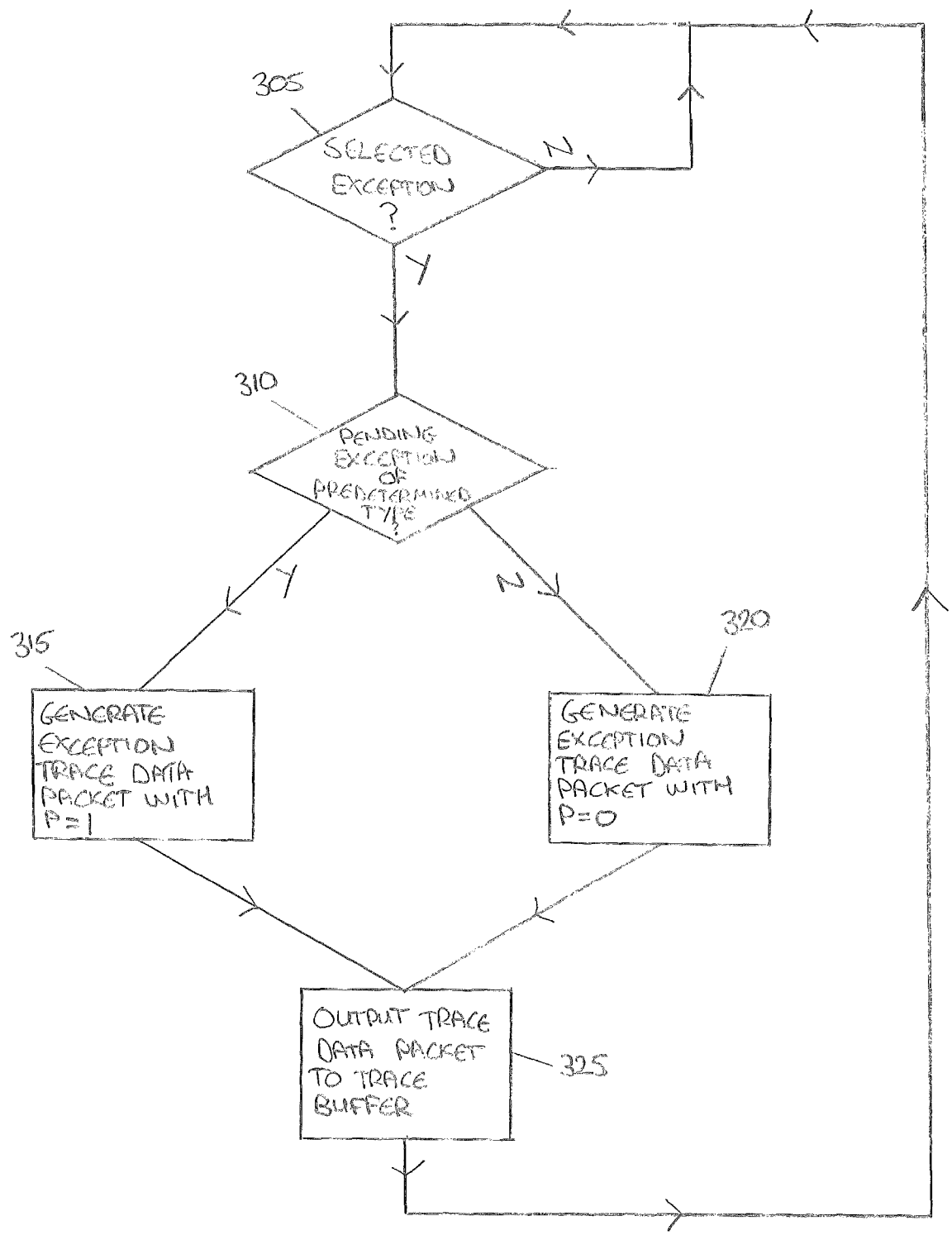
FIG. 4 schematically shows, in flow chart form, an example of a process for detecting and tracing pending exceptions in accordance with one embodiment.

FIG. 4 illustrates an example process of generating a trace data packet in response to the selection of an exception in accordance with one embodiment. Such a process may be carried out by, for example, trace unit 10.

At step 305, it is determined whether an exception has been selected for processing by the microprocessor 4. The selection may take place by exception control circuitry 6, and the detection of the selection may occur as a result of trace unit 10 snooping on exception control circuitry 6 or by detecting the microprocessor 4 entering an exception handling routine corresponding to the exception. Step 305 loops until it is detected that an exception has been selected for processing by the microprocessor 4. The method then proceeds to step 310.

At step 310, it is determined whether there is a pending exception having a predetermined type. In this embodiment, the predetermined type comprises a set of exception types that represent the occurrence of a serious fault within data processing apparatus 2. For example, these may include exceptions having types of HardFault, MemManage, or BusFault, which are shown in the table of FIG. 2. If trace unit 10 detects a pending exception of one of these types, control passes to step 315. Alternatively, if no such pending exception is detected, then control passes to step 320. It will be appreciated that there are other ways of determining which types of pending exceptions should be reported by the trace unit 10.

At step 315, trace unit 10 generates a trace data packet, an example of which is shown in FIG. 3. In this embodiment, the detection of a pending exception having a predetermined type causes the trace unit 10 to insert a logical '1' in the P field. This indicates that at the time the trace data packet was generated, trace unit 10 detected that an exception relating to a serious fault was pending and not being handled. In this embodiment, the address field of the trace data packet points to an address in the stream of instructions that microprocessor 4 was executing when the trace data packet was generated. Accordingly, it is possible to determine from the trace data packets that, when that instruction was being executed, an exception was selected for handling by microprocessor 4 and an exception representing the occurrence of a serious fault was pended and could not be handled yet.

Step 320 occurs when an exception has been selected by an exception control circuitry 6 for handling by microprocessor 4, but trace unit 10 has not detected a pending exception of the predetermined type. In this case, a trace data packet is generated in a similar manner to that of step 315. However, in this step the value of field P has a value of logical '0'. This indicates that at the time the trace data packet was generated by trace unit 10, no pending exception of the predetermined type was detected by trace unit 10.

Regardless of whether execution proceeds via step 315 or step 320, execution continues onto step 325. In step 325, the trace data packet generated by trace unit 10 is output to trace buffer 12 for subsequent output to the diagnostic apparatus 20 via trace port 14. Execution then proceeds back to step 305 where the trace unit 10 waits for an exception to be selected by exception control circuitry 6.

It will be appreciated by the skilled person that the process described with reference to FIG. 4 only describes the process of generating trace data packets as a result of exceptions being selected by selecting control circuitry 6. Trace unit 10 may additionally produce trace data packets in response to other activities carried out by the microprocessor, or indeed other circuits, including those either internal or external to data processing apparatus 2.

Furthermore, trace unit 10 may also generate a trace data packet containing an indication of a pending exception in response to some other stimulus, such as a direct request to report on whether there are any exceptions pending. Accordingly, the process described with reference to FIG. 4 is not an exhaustive description of all trace data packets produced by trace unit 10.

In accordance with the present technique, it is possible to determine from trace data when an exception became pending. This provides more useful feedback to a developer or debugger, who analyses the state of the data processing apparatus at the time when an exception occurred, rather than when it is finally selected for handling, which may occur much later. This allows more effective diagnosis of problems in the apparatus.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
processing circuitry configured to execute a stream of instructions;
exception handling circuitry configured to select, from one or more exceptions, an exception to be handled by the processing circuitry, wherein any unselected exceptions remain pending; and
trace generating circuitry configured to generate trace data packets in dependence on activity of the processing circuitry;
wherein the trace generating circuitry is configured to detect pending exceptions and, in response to a pending exception being detected, to include in at least one trace data packet an indication of the pending exception.

2. The data processing apparatus according to claim 1, wherein the trace generating circuitry is configured to include said indication of the pending exception in at least one trace data packet generated in response to the exception handling circuitry selecting an exception to be handled by the processing circuitry.

3. The data processing apparatus according to claim 2, wherein the at least one trace data packet comprises an indication of an exception type of the exception selected to be handled by the processing circuitry.

4. The data processing apparatus according to claim 1, wherein the at least one trace data packet comprises an indication of an execution point of said stream of instructions when the pending exception is detected.

5. The data processing apparatus according to claim 1, wherein said indication of a pending exception is a bit in said trace data packet indicating whether or not an exception is detected to be pending.

6. The data processing apparatus according to claim 1, wherein the trace generating circuitry is configured to include said indication of the pending exception in said at least one trace data packet in response to said pending exception being a pending exception having a predetermined characteristic.

7. The data processing apparatus according to claim 6, wherein said predetermined characteristic comprises whether an exception type associated with the pending exception is one of a predefined set of exception types.

8. The data processing apparatus according to claim 6, wherein said predetermined characteristic comprises whether a priority associated with the pending exception is greater than a predefined priority.

9. The data processing apparatus according to claim 6, wherein said predetermined characteristic comprises whether the pending exception is indicative of a fault having occurred in the data processing apparatus.

10. The data processing apparatus according to claim 1, wherein the exception handling circuitry is configured to select the exception to be handled by the processing circuitry based on a priority of said one or more exceptions.

11. The data processing apparatus according to claim 1, wherein said trace generating circuitry is configured to generate a further trace data packet in response to the pending exception being subsequently selected by said exception handling circuitry, the further trace data packet comprising an indication of the selected exception.

12. The data processing apparatus according to claim 1, wherein the trace generating circuitry is configured to generate a first trace data packet in response to the exception handling circuitry selecting an exception to be handled by the processing circuitry; and
wherein the trace generating circuitry is configured to generate a second trace data packet comprising said indication of the pending exception in response to a pending exception being detected.

13. A trace generating apparatus configured to generate trace data packets in dependence on activity of processing circuitry for executing a stream of instructions,
wherein said trace generating circuitry is configured to detect pending exceptions which have not yet been selected to be handled by said processing circuitry; and
the trace generating circuitry is configured to include in at least one trace data packet an indication of the pending exception in response to a pending exception being detected.

14. A data processing method comprising the steps:
executing a stream of instructions;
selecting, from one or more exceptions, an exception to be handled by processing circuitry, wherein any unselected exceptions remain pending; and
generating trace data packets in dependence on activity of the processing circuitry,
wherein the generating comprises detecting pending exceptions and, in response to a pending exception being detected, including in at least one trace data packet an indication of the pending exception.

15. A data processing apparatus comprising:
processing means for executing a stream of instructions;
exception handling means for selecting, from one or more exceptions, an exception to be handled by the processing means, wherein any unselected exceptions remain pending; and
trace generating means for generating trace data packets in dependence on activity of the processing means;
wherein the trace generating means is configured to detect pending exceptions and, in response to a pending exception being detected, to include in at least one trace data packet an indication of the pending exception.

* * * * *